United States Patent
Belling et al.

(10) Patent No.: US 9,432,414 B2
(45) Date of Patent: Aug. 30, 2016

(54) CONTROL OF CODEC NEGOTIATION FOR COMMUNICATION CONNECTION

(75) Inventors: Thomas Belling, Erding (DE); Adam Boeszoermenyi, Zurndorf (AT); Victor Coello, Delray Beach, FL (US); Robert Ruzitschka, Vienna (AT)

(73) Assignee: Nokia Solutions and Networks Oy, Espoo (FI)

( * ) Notice: Subject to any disclaimer, the term of this patent is extended or adjusted under 35 U.S.C. 154(b) by 1162 days.

(21) Appl. No.: 13/392,136

(22) PCT Filed: Aug. 17, 2010

(86) PCT No.: PCT/EP2010/061983
§ 371 (c)(1),
(2), (4) Date: Apr. 3, 2012

(87) PCT Pub. No.: WO2011/023601
PCT Pub. Date: Mar. 3, 2011

(65) Prior Publication Data
US 2012/0185600 A1    Jul. 19, 2012

(30) Foreign Application Priority Data

Aug. 25, 2009  (EP) .................. PCT/EP2009/060950

(51) Int. Cl.
*H04L 29/06* (2006.01)
*H04L 12/701* (2013.01)
*H04L 12/715* (2013.01)

(52) U.S. Cl.
CPC ........... *H04L 65/1069* (2013.01); *H04L 45/00* (2013.01); *H04L 45/64* (2013.01); *H04L 65/1016* (2013.01)

(58) Field of Classification Search
USPC ........................................................ 709/227
See application file for complete search history.

(56) References Cited

U.S. PATENT DOCUMENTS

2008/0152115 A1* 6/2008 Belling ................. H04W 76/04
                                                          379/207.02
2011/0243149 A1* 10/2011 Xie ....................... H04L 65/1016
                                                                370/410

FOREIGN PATENT DOCUMENTS

CN           101114985 A       1/2008
WO      WO 02/096040 A1       11/2002

OTHER PUBLICATIONS

3GPP TR 23.894 V1.1.1 (Apr. 2009), "3rd Generation Partnership Project; Technical Specification Group Services and System Aspects; System enhancements for the use of IMS services in local breakout and optimal routeing of media (Release 9)", 44 pgs.

(Continued)

*Primary Examiner* — Angela Nguyen
(74) *Attorney, Agent, or Firm* — Harrington & Smith

(57) ABSTRACT

The invention relates to a session control entity, method and a computer program product for receiving a request for a session, deciding on removal of a user plane gateway from a user plane of the session, extracting, when the user plane gateway is to be removed, a first codec list in the second encoding and removing the first codec list from the request for the session. Further, removing a second codec list in the first encoding from the request for the session, deriving a third codec list, when the user plane gateway is to be removed, from the first codec list, or, when the user plane gateway is not to be removed, from the second codec list, including in the request for the session, a third codec list in the first encoding, and transmitting the request for the session.

22 Claims, 2 Drawing Sheets

(56) References Cited

OTHER PUBLICATIONS

3GPP TS 23.228 V7.15.0 (Jun. 2009), "3rd Generation Partnership Project; Technical Specification Group Services and System Aspects; IP multimedia Subsystem (IMS); Stage 2 (Release 7)", 223 pgs.

Hari, A. et al., "Intelligent Media Gateway Selection in a VoIP Network", © 2005 Lucent Technologies, Inc., 11 pgs.

* cited by examiner

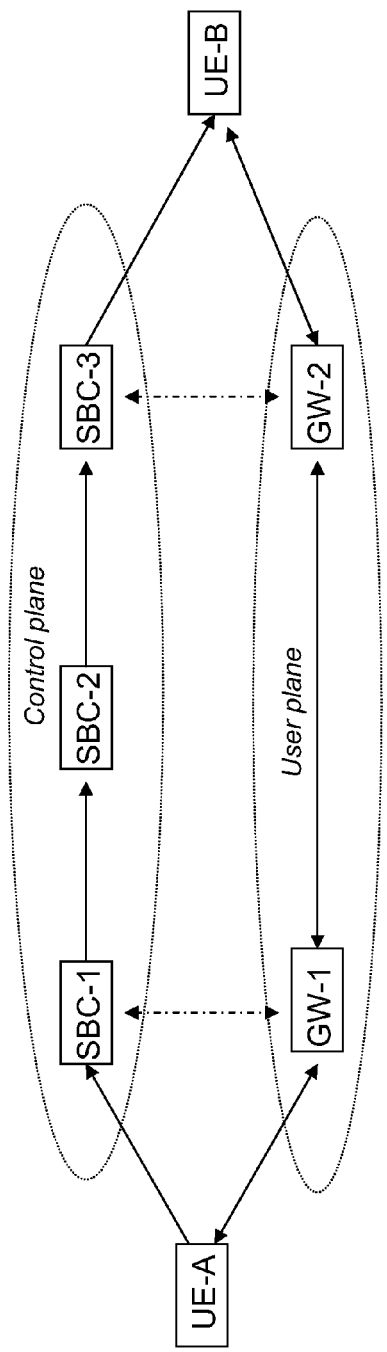
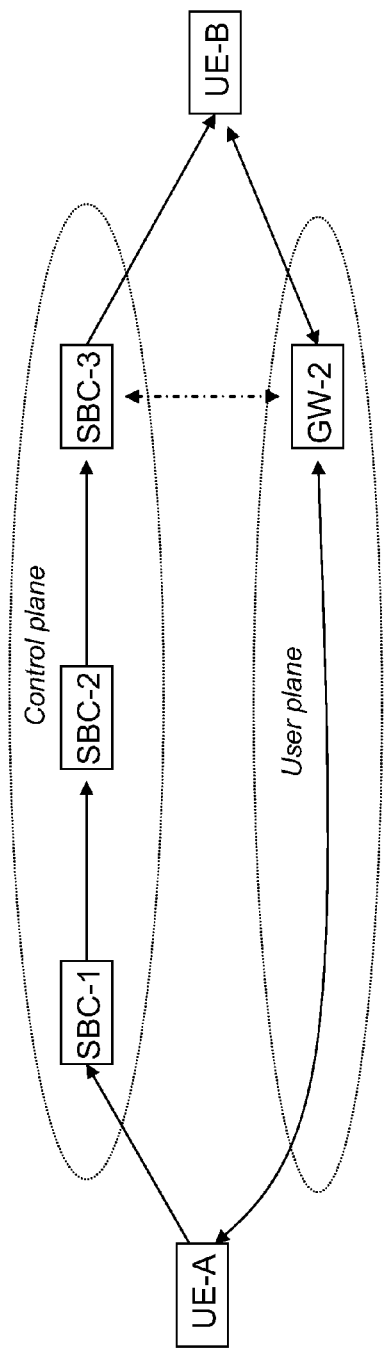

CONTROL OF CODEC NEGOTIATION FOR COMMUNICATION CONNECTION

TECHNICAL FIELD OF THE INVENTION

The present invention relates to a mechanism for controlling a codec negotiation in a communication connection. In particular, the present invention is related to a method and apparatus for controlling a codec negotiation in a communication connection, in particular, controlling routing of user plane of a session.

BACKGROUND OF THE INVENTION

In the last years, an increasing extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMax), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMax Forum and the like are working on standards for telecommunication network and access environments.

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Session Description Protocol (SDP) is a protocol which conveys information about media streams in multimedia sessions to allow the recipients of a session description to participate in the session. The SDP offers and answers can be carried in SIP messages. Diameter protocol has been defined by IETF and is intended to provide an Authentication, Authorization and Accounting (AAA) framework for applications such as network access or IP mobility.

Generally, for properly establishing and handling a communication connection between network elements such as a user equipment and another communication equipment or user equipment, a database, a server, etc., one or more intermediate network elements such as control network elements, support nodes, service nodes and interworking elements are involved which may belong to different communication networks.

Session border controllers (SBCs), for instance an interconnection border control functions (IBCF) or SIP application level gateway (SIP-ALG) within a proxy call state control function (P-CSCF), are frequently deployed at network borders between IMS networks and towards access networks or enterprise networks attached to an IMS. Such SBC frequently insert gateways into the user plane path, for instance a transition gateway (TrGW) or boarder gateway (BGW), for various purposes such as IP address and port translation and network protection. As an unfortunate side effect, the user plane is forced to traverse the same networks as the signalling plane even if much shorter user plane paths would be otherwise possible, for instance if caller and callee are located in the same visited or enterprise network, but the signalling involved still needs to traverse their home IMS networks. The purpose of optimised media routing (OMR) is to remove unnecessary gateways from the user plane path.

SUMMARY OF THE INVENTION

The present invention overcomes the above problem by providing a session control entity, a method and a computer program product for controlling routing of user plane traffic by modifying parameters of a session description protocol, comprising receiving a request for a session comprising a first codec list in a first encoding, deciding that user plane traffic of the session is to traverse a user plane gateway, including, in the request for the session, the first codec list in a second encoding, including, in the request for the session, a second codec list in the first encoding, wherein the second codec list is formed based on the first codec list with one or more codecs that the user plane gateway support added and/or one or more codecs removed based on internal configuration, and address information of the user plane gateway, and transmitting the request for the session.

Further, a session control entity, a method and a computer program product are provided, comprising:

receiving a request for a session, deciding on removal of a user plane gateway from a user plane of the session, extracting, when the user plane gateway is to be removed, a first codec list in the second encoding and removing the first codec list from the request for the session, removing a second codec list in the first encoding from the request for the session, deriving a third codec list, when the user plane gateway is to be removed, from the first codec list, or, when the user plane gateway is not to be removed, from the second codec list, including in the request for the session, a third codec list in the first encoding, and transmitting the request for the session The session control entity, method and computer program product can further comprise sending a signaling message to a request that the user plane gateway from the user plane of the session is removed, The decision on removal of the user plane gateway can be decided on based on at least one of the first codec list and the second coded list.

The first encoding can comprise encoding using m-line of the session description protocol and/or the second encoding can comprise a session description protocol attribute which is known to session control entities which support a specific action relating to controlling routing of user plane traffic, such as optimised media routing (OMR) defined by the 3GPP.

Forming the third codec list can comprise adding and/or removing one more codecs based on internal configuration, and/or removing codecs which were not included both in the first codec list and the second codec list.

The second encoding can be associated with a second attribute which is indicating address information of the user plane gateway or address information of a control entity controlling the user plane gateway. The user plane gateway can comprise an entity performing at least one of transcoding of user data, internet protocol address and/or port translation and network protection.

Embodiment of the present invention may have one or more of following advantages:

- An IMS-ALG closer to the terminating UE, that presumably has more knowledge about the terminating networks properties (e.g. access type, policies, terminal capabilities, etc) than upstream nodes can influence if upstream nodes perform transcoding. For instance, if a call was routed back to the original network only the policies in that network could be used to select codecs, irrespective of any policies in intermediate networks.
- Avoid call failures caused by the removal of other nodes not supporting the OMR, for instance, an application server (AS) controlling media resource functions (MRF) from the user plane path. Such nodes can modify the codecs in the SDP offer to offer transcoding. If such nodes are removed by the OMR from the user plane path without further provisions, codecs not supported by the peer or the network could be offered to the terminating UE, and a call failure could result if the terminating UE would select those codecs.

DESCRIPTION OF DRAWINGS

FIGS. 1a and 1b illustrate network architecture and control and user plane paths relevant for aspects of the invention.

DETAILED DESCRIPTION OF THE INVENTION

Figure 2:
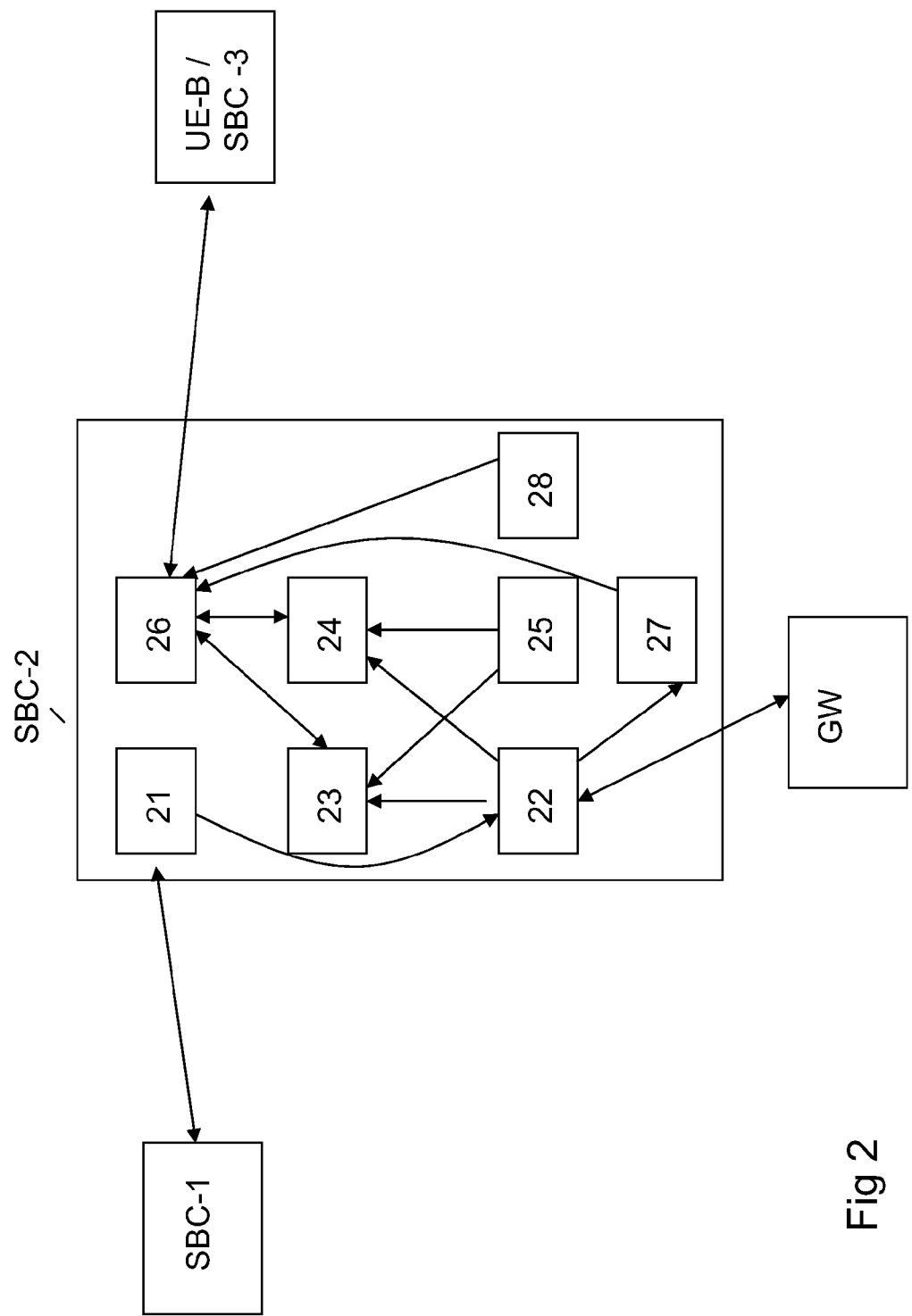
FIG. 2 illustrate internal structure and functions of an apparatus implementing aspects of the invention.

Different types of network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing a SIP registration and routing SIP requests received from another network towards the S-CSCF. The S-CSCF can perform the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF can provide services to registered and unregistered users when it is assigned to these users. This assignment can be stored in the Home Subscriber Server (HSS).

For example, in case of the IMS, an interworking network element known as Media Gateway Control Function (MGCF) is provided which performs call control protocol conversion. For example, the MGCF is used for call control protocol conversion between Session Initiation Protocol (SIP) and ISDN User Part (ISUP). The interworking network element may control a gateway network element, for example incase of the MGCF, the MGCF controls a Media Gateway (MGW), that provides a user plane interworking between both networks. MGCF and MGW may be separated network elements or may also be combined in a single physical entity.

An interconnection border control functions (IBCF) may be applied between two IP multimedia (IM) core network (CN) subsystems or between an IM CN subsystem and other SIP based multimedia networks based on operator preference. The border control function may act both as an entry point and as an exit point for a network. If it processes a SIP request received from other network it functions as an entry point, and it acts as an exit point whenever it processes a SIP request sent to other network.

The functionalities of a border control function can include:
- network configuration hiding
- acting as application level gateway (ALG)
- transport plane control, i.e. QoS control
- screening of SIP signaling, including omitting or modifying a received SIP header field prior to forwarding SIP messages
- inclusion of an interworking function (IWF) if appropriate; and
- media transcoding control in order to allow establishing communication between IM CN subsystems using different media codecs based on the interworking agreement and session information The functionalities performed by the IBCF can be configured by the operator, and can be network specific.

SIP application layer gateway (SIP-ALG) is an application layer gateway that processes the Session Initiation Protocol (SIP) signalling, can control the media proxy through a control interface, and can rewrite the Session Description Protocol (SDP) signalling to correspond to the network address translation of the media packets in the media proxy. Media proxy (MP) is a network element that is located at the border of the IP multimedia subsystem (IMS) with the purpose of helping to forward user plane traffic of IMS calls across different IP networks. A media proxy can provide functions related to the Network Address Translation—Protocol Translation (NAT-PT) for user plane traffic. During forwarding, the media proxy can change the source and destination addresses and ports in the protocol headers and performs the necessary changes, such as checksum calculations.

Basic system architecture of a communication network may comprise a commonly known architecture of a wired or wireless access network subsystem. Such an architecture comprises one or more access network control units, radio access network elements, access service network gateways or base transceiver stations, with which a user equipment is capable to communicate via one or more channels for transmitting several types of data. The general functions and interconnections of these elements are known to those skilled in the art and described in corresponding specifications so that a detailed description thereof is omitted herein. However, it is to be noted that there are provided several additional network elements and signaling links used for a communication connection or a call between user terminals and/or servers than those described in detail herein below.

Furthermore, the network elements and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/ signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Currently it has been suggested that nodes offering transcoding shall prevent that their attached gateways are removed by the OMR. As a consequence it is suggested that SBC should apply as little transcoding as possible in order not to prevent OMR. This approach has a couple of drawbacks:

- It has been suggested that the IBCF should have static knowledge if transcoding will be required and only offer transcoding in such cases. However, static knowledge of transcoding requirements might not be sufficient as the further routeing of the call setup unknown to the IBCF might impact the transcoding requirement (e.g. is roaming performed, what access type is used by the peer, does call forwarding occur, which operator policies apply, what are the terminal capabilities?). If an IBCF fails to add codecs to offer transcoding because it has no sufficient knowledge about the need for transcoding, it risks call failures. If an IBCF fails to add codecs to offer transcoding due to insufficient knowledge of transcoding requirements in the media path, it risks call failures.
- It has been also suggested that the IBCF offers transcoding in case the initial INVITE is rejected. This has the drawback to require additional signalling load, longer call setup times and elaborate IBCF procedures. This procedure is best suited if transcoding is only required for a small fraction of calls.
- An intermediate node not supporting the OMR could also add codecs in the SDP offer. If such a node does not handle OMR related signalling extensions in a suitable manner, it can be removed from the user plane by the OMR without provisions. The result is an inaccurate list of codecs not supported by the caller or the network could be offered to the callee, and a call failure could result if the callee's UE would select such unsupported codecs.

According to aspect of the invention, when receiving a session setup signalling message containing a first codec list encoded as an offer from a previous node, a first SBC can add a gateway to the user plane path by modifying address information in the session setup message, and can adds the first codecs list in an encoding to the session setup message, and can include a second codec list encoded as an offer in the session setup signalling message, and can send this session setup message to a first subsequent node (second SBC).

The first SBC can add the original m-line of the SDP received from the upstream side (originating call leg) to the SDP offer as an attribute line linked to another attribute line identifying the SBC or the added user plane gateway, such as to the visited realm attribute line. This way, another OMR-capable SBC further downstream (direction of terminating call leg) can know which codecs are applicable at the upstream call leg if it decides to remove the gateway from the media path, even if a downstream SBC which is not supporting the OMR have added or removed codecs within the SDP offer (to offer transcoding or enforce codec related network policies).

According to another aspect of the invention, when a subsequent second SBC receives this session setup message it can decide to remove the gateway controlled by the first SBC from the user plane path, In this case, the second SBC can extract and remove the first codec list in the encoding from the session setup signalling message, and can remove the second codec list encoded as an offer from the session setup signalling, and can derive the third codec list from the first codec list and can add this information encoded as an offer to the session setup signalling message, and can send this session setup message to a second subsequent node. Additionally, the second SBC can send a signalling message in backward direction that request that the first SBC removes its gateway from the user plane path.

According to further aspect of the invention, if the subsequent second SEC decides not to remove the gateway controlled by the first SBC from the user plane path, the second SBC can remove the second codec list from the session setup signalling, can derive the third codec list from the second codec list and can add this information encoded as an offer to the session setup signalling message, and can send this session setup message to a second subsequent node.

According to an aspect of the invention, a second SBC may use the information from the first codec list to decide if it removes a gateway added by the first SBC from the user plane path. If the second SBC decides to remove the first SBC from the user plane path, is can use the received information:

- to offer the codecs, as received in the first codec list, as third codec list;
- to decide if it offers transcoding itself;
- to offer transcoding by adding an own TrGW to the user plane path and by adding codecs to the received first codec list before forwarding this new list as third codec list;
- to enforce its own network policies by removing unacceptable codec from the first codec list before forwarding them as third codec list;
- to enforce network policies in previous networks by comparing the codecs in the second codec list with the codecs in the first codec list and removing any codecs not contained in the second codec list from the codecs in first codec list, before forwarding the remaining codecs as the third codec list;
- to configure its attached gateway with the codecs applicable at the upstream side.

According to an aspect of the invention, a second SBC can transmit a SIP response message as signalling message in backward direction to request that one or several other SBCs remove their gateways from the user plane path, and can send this message when receiving a SIP response from the downstream side. This has the advantage that extra signalling load can be avoided, and complexity at the SBC required to generate own signalling messages can also be avoided.

According to an aspect of the invention, a first SBC can derive the second codec list from the first codec list. It can either use the entire first codec list as second codec list, or can remove codecs from the first list to enforce own network policies, or can add new codecs to offer transcoding.

According to an aspect of the invention, when receiving a signalling message that request that an SBC removes its gateway, that SBC, for instance the first SBC, can release all resources associated with the related call at the gateway, and does not insert gateway related address information in any subsequent session signalling it forwards. In contrast, while the gateway is inserted in the user plane path, the SBC can modify user plane related address information in the session signalling by inserting gateway related address information.

According to an aspect of the invention, a third SBC may be located in the signalling path between the first and the second SBC. The third SBC can also apply procedures as described for the first SBC. It can add an own gateway to the user plane path, add a new second codec list encoded as an offer, which is preferably derived from the old received second codec list encoded as an offer, and add the received second codec list as a fourth codec list in the second encoding, and then forwards the session setup signalling message.

Furthermore, within the session setup signalling message the third SBC can forward any codec list received in the second encoding, i.e. the received first codec list, keeping the second encoding. The session setup signalling message sent by the third SBC can contain three codec lists, the new second codec list encoded as an offer, the first codec list inserted by the first SBC in the second encoding, and the fourth codec list inserted by the third SBC in the second encoding.

According to an aspect of the invention, if the second SBC decides to remove only the gateway controlled by the third SEC, it applies the same logic as described above, but can use the forth codec list instead of the first codec list, and can send a signalling message in backward direction requesting the third SBC to remove its gateway from the user plane path.

According to an aspect of the invention, if the second SBC decides to remove both the gateway controlled by the first SBC and all gateways controlled by intermediate SBCs between the first and the second SBC, i.e. the third gateway controlled by the third SBC, from the user plane path, it can apply the same logic as described above. In addition, it can remove any codec list inserted by the intermediate SBCs, i.e. the fourth codec list, from the session setup signalling message before forwarding this message without making further use of the contained information, and can send a signalling message in backward direction requesting both the first SBC and all intermediate SBCs, i.e. the third SBC, to remove their gateways from the user plane path.

The actions described for the first, the second and the third SBC may be executed by the same SBC, to allow for a scenario where the SBC is located between other SBC in the signalling path. The same logic can be applied to allow for more than a single third SBC to be located between the first and the second SBC.

According to an aspect of the invention, all nodes offering transcoding can support the proposed signalling extensions, but has the advantage that the sent SDP is kept shorter, as information is only added when a node modifies the offered codec list. In this embodiment, when receiving a session setup signalling message containing a first codec list encoded as an offer from a previous node, an SBC (for instance the first or third SBC), which adds a gateway to the user plane path by modifying address information in the session setup message and is capable to remove this gateway from the user plane path when receiving a request message, can only add a codec list in the second encoding to the session setup signalling message it sends to a subsequent node if it also modifies the offered codec list in the session setup message.

Furthermore when receiving a session setup signalling message containing a first codec list encoded as an offer from a previous node, any other node, such as an AS controlling a MRF, which modifies the offered codec list in the session setup message, can add a codec list in the second encoding to the session setup signalling message it sends to a subsequent node.

According to an aspect of the invention, codec lists encoded as an offer, i.e. the first codec list when received by the first SBC, the second codec list and the third codec list, can be encoded using an SDP m-line. This m-line will be understood and properly processed by any node supporting SDP.

According to an aspect of the invention, a codec list in the second encoding, i.e. the first codec when being forwarded by the first SBC, can be encoded as a new SDP attribute. This has the advantage that this attribute will be ignored by a node not supporting controlling the user plane routing according to aspects of the invention. The information can then only be taken into account by a second SBC that also sends a request to the first SBC to remove the attached gateway.

According to an aspect of the invention, any available information associated with codecs in the codec list in the second encoding, such as additional SDP "fmtp" and "rtp-map" attribute lines associated with the m-line that originally contained the codec list that was then transformed into the codec list in the second encoding, can also be added in the new second encoding, for instance within additional new SDP attribute lines.

According to an aspect of the invention, a codec list in the second encoding can be associated with an identifier of the SBC that originally inserted the codec list in the second encoding. If another node inserted the codec list in the second encoding, the identifier of the previous upstream SBC in the call setup signalling path can be associated with the second codec list instead. Such an identifier can be, for instance, an arbitrary random identifier generated by that SBC, a hostname of the SBC, an IP address associated with the SBC or the inserted gateway. The identifier can be included in the same attribute line as the codec list in the second encoding, or in an additional SDP attribute line. This identifier of the SBC can be also be used in the signalling message in backward direction that requests that that SBC removes it gateway from the user plane path.

The identifier of the SBC can be indicated using SDP extension attribute 'visited-realm' that can provide connection and port information for a previous or/and subsequent IP realm on the signalling path. Each instance of visited-realm can have an instance number, realm identifier, connection/port data, and optional cryptographic signature computed using an algorithm private to each IP realm so as to ensure the integrity of the visited-realm data. The realm attributes can be received offers assist IMS-ALGs in the determination of TrGWs to be bypassed. Upon inspection of the realm attribute, IMS-ALGs may decide on the TrGW allocation. If an IMS ALG decides that previous TrGWs can be bypassed, it can indicate this to their controlling IMS-ALGs based on the realm identifier in the SDP answer.

As an example for one possible encoding, the second SBC may receive SDP containing the lines below in that order:
The SDP m-line encoding the offered codec list
Any associated additional SDP "fmtp" and "rtpmap" attribute lines,
An SDP attribute line encoding the SBC identifier of the first SBC
An SDP attribute line encoding the first codec list in the second encoding
Possible new SDP attribute lines encapsulating any additional SDP "fmtp" and "rtpmap" attribute lines associated with the first codec list
An SDP attribute line encoding the SBC identifier of the third SBC
An SDP attribute line encoding the fourth codec list in the second encoding
Possible new SDP attribute lines encapsulating any additional SDP "fmtp" and "rtpmap" attribute lines associated with the fourth codec list In this example, the order of SDP lines provides information about their interrelationships.

According to an aspect of the invention, a codec from both the offered codec list and the codec list in the second encoding can be listed in the SDP m-line. One or several new SDP attribute line associated with the m-line can be added to express that one or several codec in the m-line are part of a codec list in the second encoding, and that one or several codec in the m-line are part of the offered codec list. Those new SDP attribute lines can describe the codecs as a fist of RTP payload types, that can also appear as "format" parameter within the SDP m-line. This can have the advantage that the SDP can be kept shorter, as additional SDP "fmtp" and "rtpmap" attribute lines associated with the m-line do not need to be repeated.

FIG. 1a illustrates how control plane (e.g SIP signaling) and user plane (actual user data) can be routed between a first user UE-A and a second user UE-B. The control plane traverses three session control entities, such as SDBs. The SBC-1 decides to add a user plane gateway GW-1 to user plane path. The SBC-2 add no gateway to user plane path, but again the SBC-3 adds a user plane gateway GW-2 to user plane path. The SBC-1 can control the GW-1 with gateway control signaling as illustrated with dashed arrow between the SBC-1 and GW-1 (and correspondingly between SBC-3 and GW-2). The unidirectional arrows between control plane elements from UE-A to UE-B illustrate the direction of a session setup, however, signaling message relating to the session setup can be transmitted to both directions. UE-A is located upstream from SBCs viewpoint and UE-B is located downstream from SBCs viewpoint. Bidirectional arrows in user plane illustrate that user data can be transmitted to both directions between UE-A and UE-B. If each SBC decide independently about adding GWs in user plane path, the end result may not be optimal, as in the final configuration unnecessary GWs may have been added.

FIG. 1b illustrates more optimal situation in which, according to aspects of the invention, the SBC-3 has detected in the received call setup signaling from the SBC-1 (via SBC-2) that GW-1 has been added by the SBC-1 to the user plane path. The SBC-3 can decide to remove the GW-1 from the user plane path as the SBC-3 has more knowledge of terminating network and UE-B related properties and can therefore make more optimal decision on needed GWs in the user plane path. The SBC-3 can signal to SBC-1 to remove the GW1, and the SBC-3 can decide to add its own GW-2 to the user plane path.

FIG. 2 illustrates internal structure and functions of an apparatus implementing aspects of the invention. The apparatus has a receiving unit 21 configured to receive session setup signaling, such as SIP (for example SIP INVITE request). The receiving unit 21 can be able to receive SDP encapsulated in the session setup signaling, and codec lists encoded in the session setup signaling for example using the SDP, for example in m-line of SDP. A deciding unit 22 can be configured to decide if a gateway (GW) is to be added to user plane path and/or if at least one of the gateways added by previous SBCs (from which the session setup signaling is received) are to be removed from the user plane path. In decision making, the deciding unit 22 can use the information received by the receiving unit 21, such as codec lists. The deciding unit 22 can also use configuration from internal policy unit 25. The deciding unit 22 can control the GW with gateway control protocol. A first including unit 23 can be configured to include a first codec list, received by the receiving unit 21, into session setup signaling to be forwarded to a next node in the control plane. The first including unit 23 can be configured to include the first codec list in an attribute in the SDP. A second including unit 24 can be configured to include, in the session setup signaling, a second codec list in the first encoding (such as SDP, for example with m-line), and the second codec list can be formed based on the first codec list. The second including unit 24, when forming the second codec list, can be configured to add one or more codecs that the user plane gateway GW supports and/or remove one or more codecs based on internal configuration received from the internal policy unit 25. The second including unit 24 can be configured to and address or identity information of the user plane gateway or the SBC that can control the user plane gateway. The address or identity information can be included in an SDP attribute and can be associated with a corresponding codec list (such as the second codec list). A transmitting unit 26 can be configured to transmit the session setup signaling to the next node (SBC/towards UE-B). If the deciding unit 22 decides to remove a gateway inserted in the user plane path by a previous SBC, a removing unit 27 can be configured to remove the encoded first codec list (coded e.g. in an SDP attribute), and/or to remove the second codec list (coded e.g. in SDP m-line) from the session setup signaling. A third including unit 28 can be configured to derive a third codec list, when the user plane gateway is to be removed, from the first codec list, or, when the user plane gateway is not to be removed, from the second codec list and including the third codec list in the session setup signaling. The third codec list can be encoded according to SDP (m-line, for example). The transmitting unit 26 can be configured to transmit a request to originating direction to instruct a previous SBC to remove its GW from the user plane path. The request can be included in a SIP response message.

All units described above may be implemented for example using microprocessors, chips and/or other electrical components and/or by software.

A session control entity may be physically implemented in a switch, router, server or other hardware platform or electronic equipment which can support data transmission and processing tasks, or can be implemented as a component of other existing device.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), Bluelooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The invention is not limited to codec negotiation in the IMS network(s), but may also be applied in other type of networks having similar kind of session parameter negotiation logic, and possibility to optimize user plane routing. Functions of the session control entity described above may be implemented by code means, as software, and loaded into memory of a computer.

The invention claimed is:

1. Method for controlling routing of user plane traffic by modifying parameters of a session description protocol, comprising
receiving a request for a session comprising a first codec list in a first encoding,
deciding that user plane traffic of the session is to traverse a user plane gateway,
including, in the request for the session, the first codec list in a second encoding,
including, in the request for the session:
    a second codec list in the first encoding, wherein the second codec list is formed based on the first codec list with one or more codecs that the user plane gateway supports added, and
    address information of the user plane gateway, and transmitting the request for the session.

2. The method of claim 1 wherein the first encoding comprises encoding as m-line of the session description protocol according to the session description protocol, and/or wherein the second encoding comprises a session description protocol attribute which is known to session control entities which support a specific action relating to controlling routing of user plane traffic.

3. Method according to claim 1, wherein the second codec list is formed based on the first codec list with one or more codecs that the user plane gateway supports added and one or more codecs removed based on internal configuration.

4. A non-transitory computer readable memory storing instructions, that, when executed by at least one processor, cause an apparatus to perform the steps of claim 1.

5. A session control entity, comprising:
at least one processor; and
at least one memory including computer program code;
the at least one memory and the computer program code are configured to, with the at least one processor, cause the session control entity at least to:
receive a request for a session,
decide on removal of a user plane gateway from a user plane of the session,
extract, when the user plane gateway is to be removed, a first codec list in a second encoding and removing the first codec list from the request for the session, remove a second codec list in a first encoding from the request for the session,
derive a third codec list, when the user plane gateway is to be removed, from the first codec list, or, when the user plane gateway is not to be removed, from the second codec list,
include in the request for the session, a third codec list in the first encoding, and
transmit the request for the session.

6. The session control entity of claim 5 wherein the at least one memory and the computer program code configured to, with the at least one processor, cause the session control entity at least to send a signaling message comprising a request that the user plane gateway from the user plane of the session is removed.

7. The session control entity of claim 5 wherein the at least one memory and the computer program code configured to, with the at least one processor, cause the session control entity at least to decide on the removal of the user plane gateway based on at least one of the first codec list and the second coded list.

8. The session control entity of claim 5 wherein the first encoding comprises encoding using m-line of the session description protocol and/or wherein the second encoding comprises a session description protocol attribute which is known to session control entities which support a specific action relating to controlling routing of user plane traffic.

9. The session control entity of claim 5, wherein deriving the third codec list comprises adding and/or removing one or more codecs based on internal configuration.

10. The session control entity of claim 5, wherein deriving the third codec list comprises removing codecs which were not included both in the first codec list and the second codec list.

11. The session control entity of claim 5, wherein the second encoding is associated with a second attribute which is indicating address information of the user plane gateway or address information of a control entity controlling the user plane gateway.

12. The session control entity of claim 5, wherein the user plane gateway comprise an entity performing at least one of transcoding of user data, internet protocol address and/or port translation and network protection.

13. A method for controlling routing of user plane traffic, comprising
receiving a request for a session,
deciding on removal of a user plane gateway from a user plane of the session,
extracting, when the user plane gateway is to be removed, a first codec list in a second encoding and removing the first codec list from the request for the session,
removing a second codec list in a first encoding from the request for the session,
deriving a third codec list, when the user plane gateway is to be removed, from the first codec list, or, when the user plane gateway is not to be removed, from the second codec list,
including in the request for the session, the third codec list in the first encoding, and
transmitting the request for the session.

14. The method of claim 13 further comprising sending a signaling message comprising a request that the user plane gateway from the user plane of the session is removed.

15. The method of claim 13 wherein deciding on removal of a user plane gateway comprises deciding based on at least one of the first codec list and the second coded list.

16. The method of claim 13 wherein the first encoding comprises encoding using m-line of the session description protocol and/or wherein the second encoding comprises a session description protocol attribute which is known to session control entities which support a specific action relating to controlling routing of user plane traffic.

17. The method of claim 13, wherein deriving the third codec list comprises adding and/or removing one more codecs based on internal configuration.

18. The method of claim 13, wherein deriving the third codec list comprises removing codecs which were not included both in the first codec list and the second codec list.

19. The method of claim 13, wherein the second encoding is associated with a second attribute which is indicating address information of the user plane gateway or address information of a control entity controlling the user plane gateway.

20. The method of claim 13, wherein the user plane gateway comprise an entity performing at least one of transcoding of user data, internet protocol address and/or port translation and network protection.

21. A non-transitory computer readable memory storing instructions, that, when executed by at least one processor, cause an apparatus to perform the steps of claim 13.

22. A non-transitory computer readable memory storing instructions, that, when executed by at least one processor, cause an apparatus to perform the steps of claim 3.

* * * * *